US010663105B2

(12) United States Patent
Chen et al.

(10) Patent No.: US 10,663,105 B2
(45) Date of Patent: May 26, 2020

(54) SUPPORTING DEVICE (71) Applicant: SYNCMOLD ENTERPRISE CORP., New Taipei (TW)

(72) Inventors: Yan-Ying Chen, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 16/251,817

(22) Filed: Jan. 18, 2019

(65) Prior Publication Data

US 2019/0226630 A1     Jul. 25, 2019

Related U.S. Application Data

(60) Provisional application No. 62/619,517, filed on Jan. 19, 2018.

(30) Foreign Application Priority Data

Nov. 5, 2018 (TW) .............................. 107215013 U (51) Int. Cl.
| F16M 11/00 | (2006.01) |
| F16M 11/04 | (2006.01) |
| F16M 11/10 | (2006.01) |

(52) U.S. Cl.
CPC ........... *F16M 11/046* (2013.01); *F16M 11/10* (2013.01)

(58) Field of Classification Search
CPC .................................................. F16M 11/046
USPC ................ 248/122.1, 125.1, 920, 125.2, 917
See application file for complete search history.

(56) References Cited

U.S. PATENT DOCUMENTS

| 7,815,154 B2* | 10/2010 | Oh ....................... F16M 11/105 248/176.3 |
| 9,857,020 B2* | 1/2018 | Yeh ....................... F16M 11/046 |
| 2008/0210841 A1* | 9/2008 | Tseng .................. F16M 11/046 248/422 |
| 2009/0179133 A1* | 7/2009 | Gan ..................... F16M 11/105 248/422 |
| 2013/0256489 A1* | 10/2013 | Ergun .................... F16M 11/24 248/297.11 |
| 2017/0051865 A1* | 2/2017 | Chen .................... F16M 11/041 |
| 2019/0226629 A1* | 7/2019 | Chen .................... F16M 11/046 |

FOREIGN PATENT DOCUMENTS

TW     M469418 U     1/2014

* cited by examiner

*Primary Examiner* — Steven M Marsh
(74) *Attorney, Agent, or Firm* — Muncy, Geissler, Olds & Lowe, P.C.

(57) ABSTRACT

A supporting device including an upright, a diverting structure, a connecting element, a holder, and a counter-weight module is provided. The diverting structure includes a first diverting element disposed on the upright, and the connecting element is partially winding up the first diverting element. The holder is linked to the connecting element or the diverting structure. The holder is to support the display, and is slidably abutting against the upright. The counter-weight module is connected with the connecting element, slidably abutting against the upright, and opposite to the holder. When an external force is applied to move the display relative to the upright and the connecting element drives the counter-weight module to move simultaneously. When the external force is removed, the display is able to stop relative to the upright.

13 Claims, 10 Drawing Sheets

SUPPORTING DEVICE

CROSS REFERENCE TO RELATED APPLICATION

This application claims the benefit of U.S. Provisional Application Ser. No. 62/619,517 filed on Jan. 19, 2018, and the benefit of Taiwan Patent Application Serial No. 107215013 filed on Nov. 5, 2018. The entirety of each said Application is incorporated herein by reference.

BACKGROUND OF THE INVENTION

1. Field of the Invention

The present invention relates to a supporting device, more particularly, to a supporting device having a diverting structure.

2. Description of Related Art

A conventional supporting device includes a frame, a sliding track module, a sliding element, a holder and a constant force spring. The sliding track module is disposed between the frame and the sliding element. The constant force spring is connected between the frame and the sliding element. The holder is connected to the sliding element to support a display. The display, the holder and the sliding element are able to move down or up relative to the frame through the sliding track module. When the display, the holder and the sliding element move relative to the frame, the constant force spring is stretched and provides a resilience force. The weight of the display, the resilience force and the frictions between the components are in a static balancing state so that the display may stop at any selected position relative to the frame.

The present invention provides a supporting device, utilizing a diverting structure comprising at least one fixed pulley, or the assembly of at least one fixed pulley and at least one movable pulley, to omit the conventional sliding track module and the constant force spring.

SUMMARY OF THE INVENTION

The present invention provides a supporting device which is able to omit the conventional sliding track module and the constant force spring.

In order to solve the abovementioned problems, the supporting device of the present invention includes a diverting structure which comprises at least one fixed pulley, or the assembly of at least one fixed pulley and at least one movable pulley.

The supporting device of the present invention is provided for supporting a display on a working surface. The supporting device comprises a base, an upright, a diverting structure, a holder, a counter-weight module and a connecting element. The base is disposed on the working surface, and the upright is disposed on the base. The diverting structure includes a first diverting element disposed on the upright. The holder is for supporting the display, and slidably abutting against the upright. The counter-weight module slidably abuts against the upright. The connecting element is partially winding up the first diverting element, and includes a first end connecting to one of the upright and the holder, and a second end connecting to the counter-weight module. When an external force is applied to move the display relative to the upright, the connecting element is driven to make the counter-weight module move simultaneously, and the display is able to stop relative to the upright at any position when the external force is removed.

In an embodiment of the present invention, the first diverting element is a fixed pulley. The first end is fixed to the holder and the second end is connected to the counter-weight module. The sum of the weight of the display and the weight of the holder is equal to the weight of the counter-weight module. A first stroke of the holder along the upright is equal to a second stroke of the counter-weight module along the upright.

The connecting element has a connecting section located between the first diverting element and the counter-weight module. The tensile force of the connecting section is the sum of the weight of the display and the weight of the holder.

In another embodiment of the present invention, the diverting structure further includes a second diverting element disposed on the holder. The connecting element is sequentially and partially winding up the first diverting element and the second diverting element. The first end is fixed to the upright and the second end is connected to the counter-weight module.

The one-half of the sum of the weights of the display and the holder is equal to the weight of the counter-weight module, and a first stroke of the holder along the upright is equal to one-half of a second stroke of the counter-weight module along the upright. The connecting element has a connecting section located between the first diverting element and the counter-weight module. The tensile force of the connecting section is one-half of the sum of the weight of the display and the weight of the holder. The second diverting element is a movable pulley.

In yet another embodiment of the present invention, the diverting structure further includes a second diverting element and a third diverting element. The second diverting element is disposed on the holder, and the third diverting element is disposed on the upright. The connecting element is sequentially and partially winding up the first diverting element, the second diverting element, and the third diverting element. The first end is fixed to the holder and the second end is connected to the counter-weight module.

The one-third of the sum of the weights of the display and the holder is equal to the weight of the counter-weight module, and a first stroke of the holder along the upright is equal to one-third of a second stroke of the counter-weight module along the upright. The connecting element has a connecting section located between the first diverting element and the counter-weight module. The tensile force of the connecting section is one-third of the sum of the weight of the display and the weight of the holder. The second diverting element is a movable pulley, and the third diverting element is a fixed pulley.

In further another embodiment of the present invention, the diverting structure includes a second diverting element, a third diverting element, and a fourth diverting element. The second diverting element and the fourth diverting element are disposed on the holder, and the third diverting element is disposed on the upright. The connecting element is sequentially and partially winding up the first diverting element, the second diverting element, the third diverting element, and the fourth diverting element. The first end is fixed to the upright, and the second end is connected to the counter-weight module.

The one-quarter of the sum of the weights of the display and the holder is equal to the weight of the counter-weight module. A first stroke of the holder along the upright is equal to a one-quarter of a second stroke of the counter-weight module along the upright. The connecting element has a connecting section located between the first diverting element and the counter-weight module. The tensile force of the connecting section is one-quarter of the sum of the weight of the display and weight of the holder. The second diverting element and the fourth element are movable pulleys, and the third diverting element is a fixed pulley.

In the present invention, the upright includes a first sliding groove and a second sliding groove. The holder includes a sliding element. The counter-weight module includes a weight-bearing element and a counter-weight unit. A plurality of first followers of the sliding element and a plurality of second followers of the weight-bearing element are respectively disposed in the first sliding groove and the second sliding groove. The weight-bearing element is connected to the connecting element and disposed between the upright and the counter-weight unit. When the holder and the counter-weight module move relative to the upright, the first followers slide in the first sliding groove and generate a frictional force, and the second followers slide in the second sliding groove and generate another friction.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
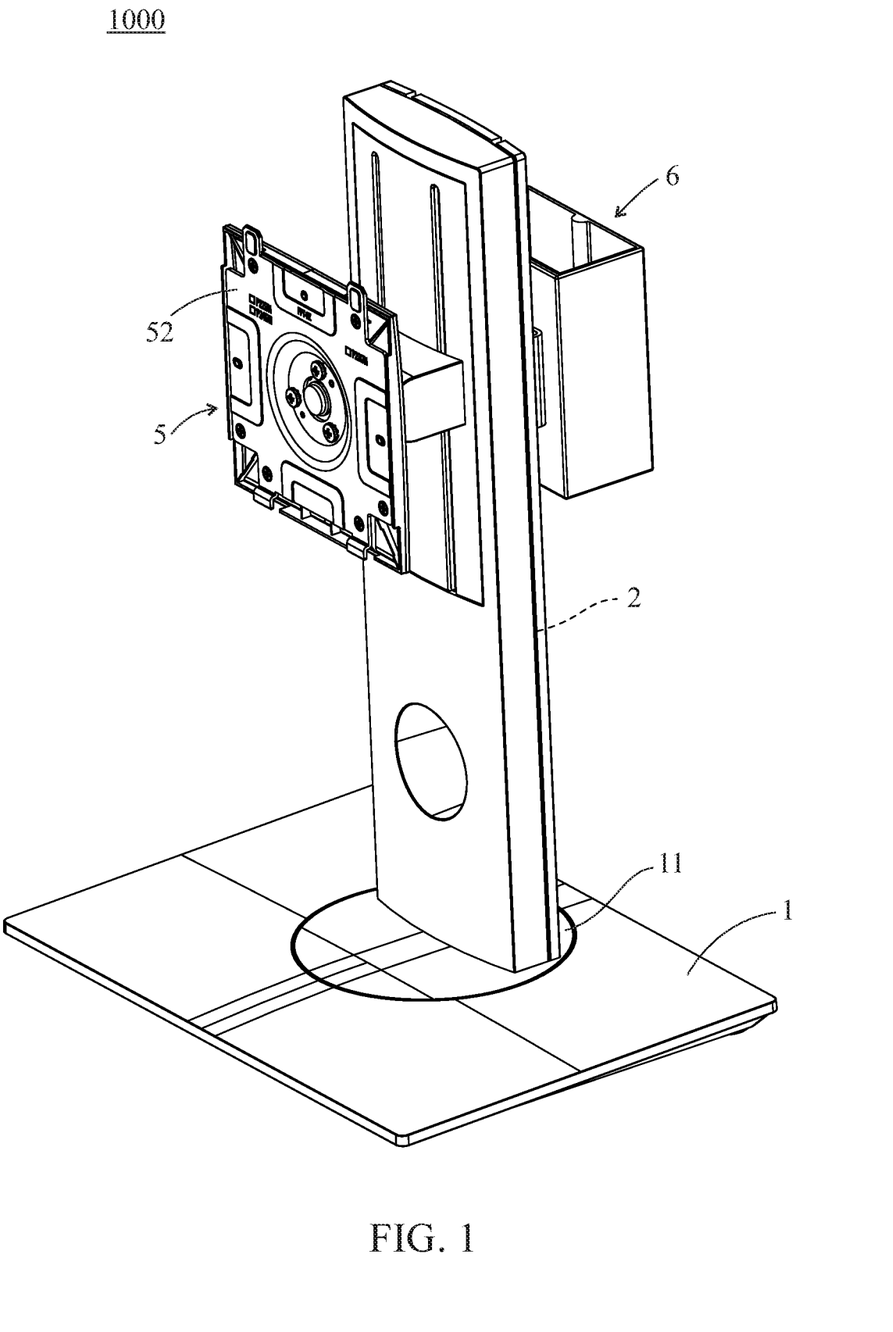
FIG. 1 is a perspective view of the supporting device according to the present invention.
Figure 2:
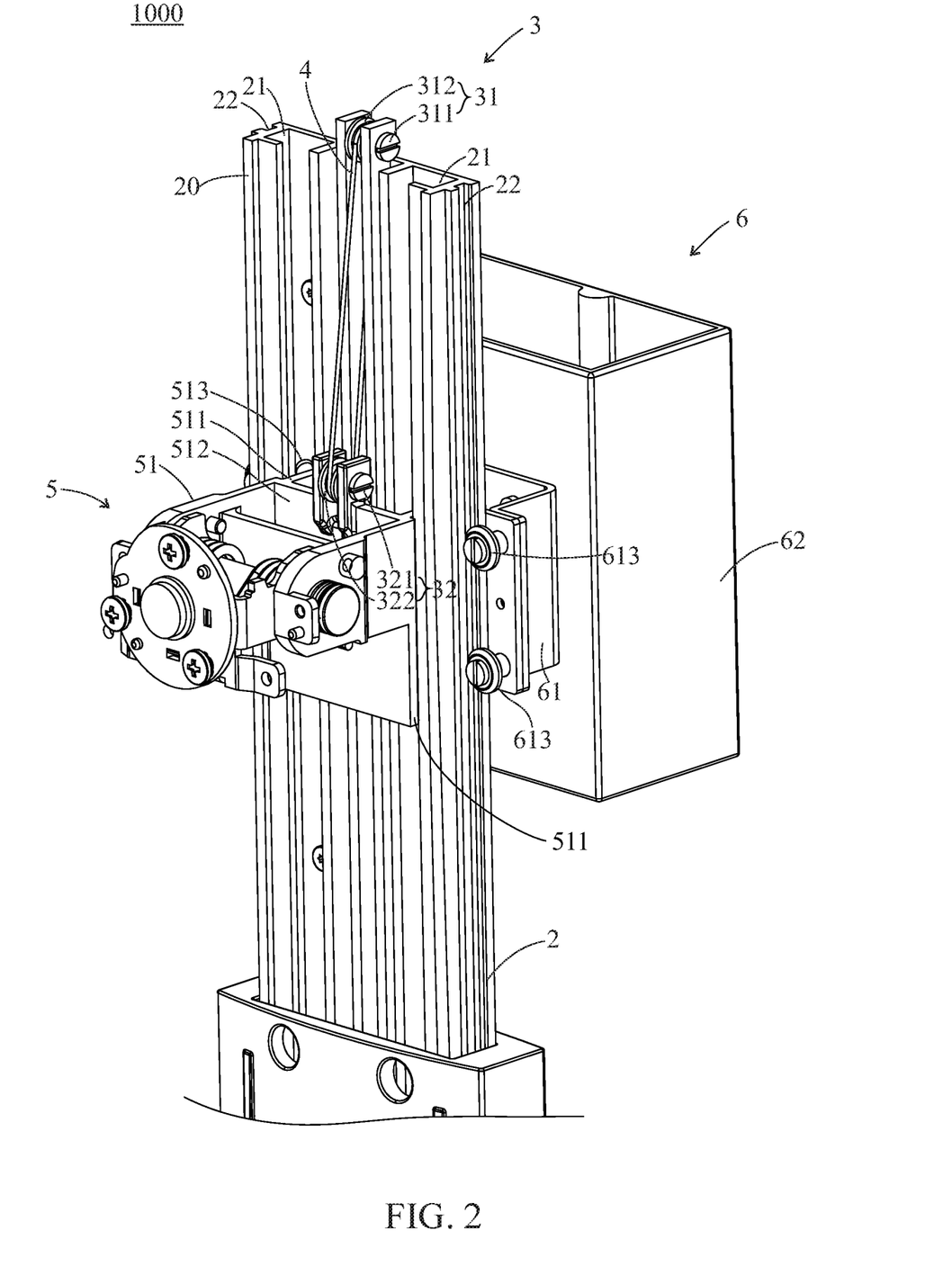
FIG. 2 is a partial perspective view of the first embodiment of the supporting device according to the present invention.
Figure 3:
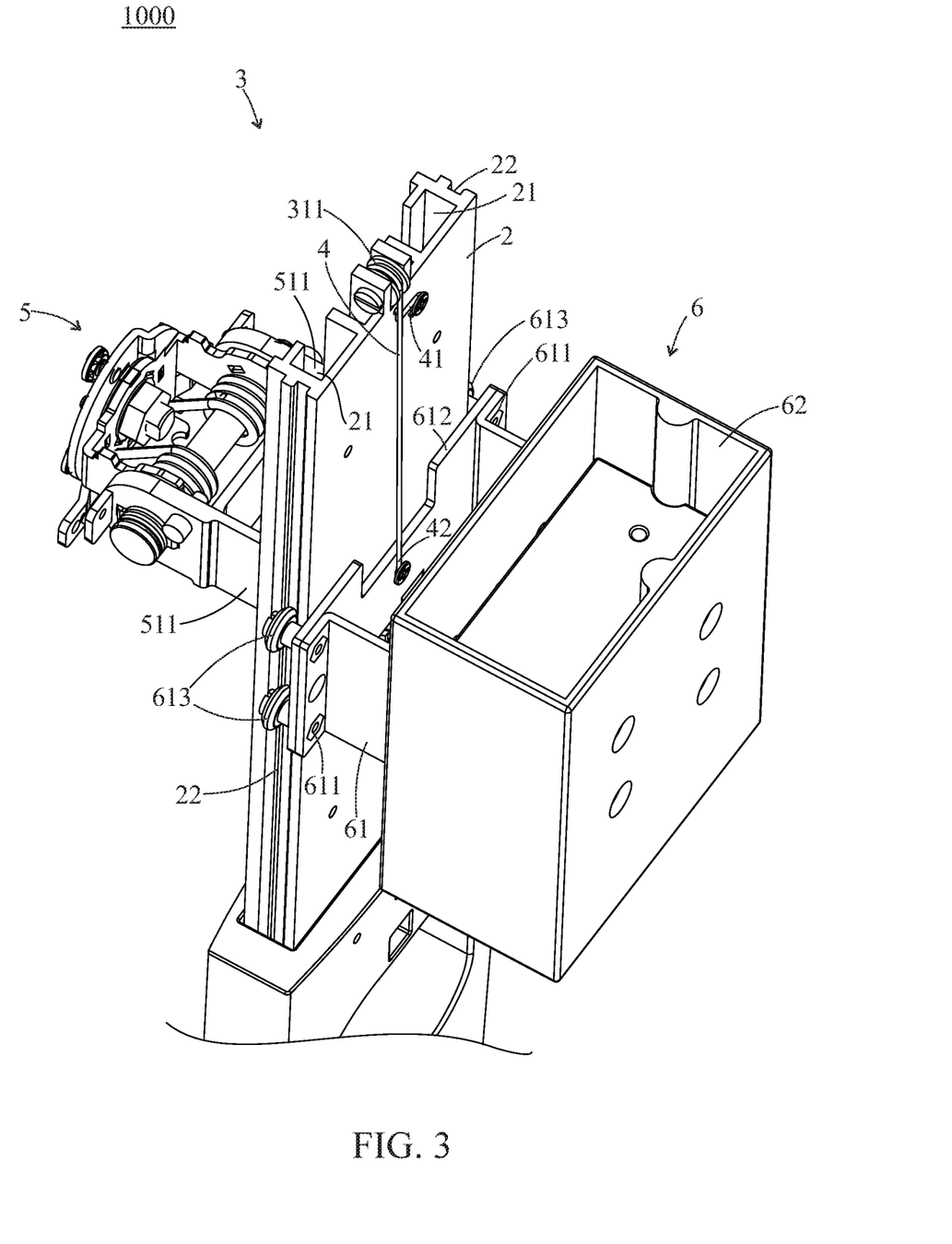
FIG. 3 is another partial perspective view of the first embodiment of the supporting device according to the present invention.

Structures of the embodiments will be described in details in following paragraphs. With reference to FIGS. 1 to 3, the first embodiment of the supporting device 1000 according to the present invention is provided for supporting a display 2000 (referring to FIG. 4) on a working surface (not shown). The supporting device 1000 includes a base 1, an upright 2, a diverting structure 3, a connecting element 4, a holder 5 and a counter-weight module 6.

The base 1 is disposed on the working surface and is provided for the upright 2 being disposed thereon. In this embodiment, the upright 2 is disposed on a rotating plate 11 of the base 1. The upright 2 may rotate relative to the working surface through the rotating plate 11. In other embodiments of the present invention, the base 1 may not include the rotating plate 11. The upright 2 includes a body 20, two first sliding grooves 21 and two second sliding grooves 22. The first sliding grooves 21 are formed on two sides of the body 20 and adjacent to the holder 5, and the second sliding grooves 22 are respectively formed on the body 20 and on the corresponding outer sides of the first sliding grooves 21.

In the first embodiment of the present invention, the diverting structure 3 has a first diverting element 31 and a second diverting element 32. The first diverting element 31 has a first axle 311 and a first pulley 312, wherein the first axle 311 is fixed on the top of the upright 2, the first pulley 312 is sleeved on the first axle 311, and the first pulley 312 may rotate relative to the first axle 311. The second diverting element 32 has a second axle 321 and a second pulley 322, wherein the second axle 321 is fixed to the holder 5. The second pulley 322 is sleeved on the second axle 321, and may rotate relative to the second axle 321.

The connecting element 4 is a steel cable in this embodiment, whereas it may be a tension rope or a belt in other embodiments. The connecting element 4 has a first end 41 and a second end 42 opposite to the first end 41. Sequentially, the connecting element 4 is partially winding up the first pulley 312 and second pulley 322, wherein the first end 41 is fixed on the upright 2, and the second end 42 is connected to the counter-weight module 6. Because the holder 5 may move relative to the upright 2, the first diverting element 31 is a fixed pulley and the second diverting element is a movable pulley in this embodiment.

The holder 5 has a sliding element 51 and a carrying plate 52 which are connected to each other. The carrying plate 52 is utilized to support the display 2000. One end of the sliding element 51 has two first side wings 511, a first center plate 512 and four first followers 513. The first side wings 511 extend outwards from the first center plate 512 with a space from each other, and respectively reach into the first sliding grooves 21. The second diverting element 32 is disposed on the first center plate 512. Each of the side wings 511 is equipped with two of the first followers 513. Each of the first followers 513 moves in the corresponding one of the first sliding grooves 21 when the holder 5 moves relative to the upright 2.

The counter weight module 6 includes a weight-bearing element 61 and a counter-weight unit 62. The counter-weight unit 62 is a personal computer (PC) in this embodiment. However, the counter-weight unit 62 may be a plurality of weight blocks such as weights in other embodiments, or a PC with a plurality of weight blocks in yet other embodiments. The weight-bearing element 61 is a slider in this embodiment. The counter-weight unit 62 is disposed on one end of the weight-bearing element 61 away from the upright 2. The other end of the weight-bearing element 61 has two second side wings 611, a second center plate 612 and four second followers 613. Two of the second followers 613 as a pair are disposed on each of the second wings 611, wherein each of the second followers 613 may move in corresponding one of the second sliding grooves 22.

Figure 4:
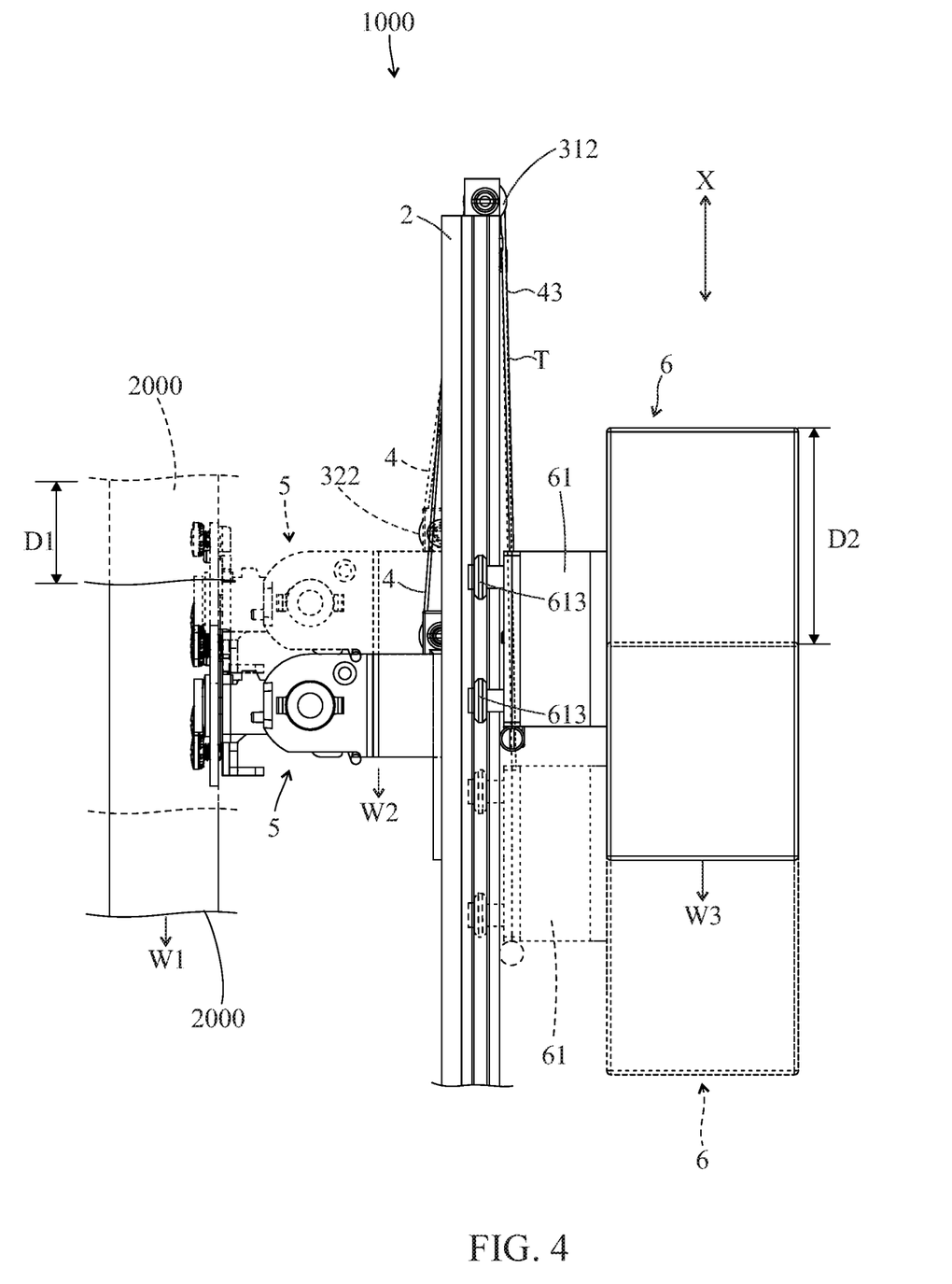
FIG. 4 is an illustration of movement of the first embodiment of the supporting device according to the present invention.

In this embodiment, with reference to FIG. 4, when an external force is applied downwards to the display 2000, the display 2000 and the holder 5 would move downwards along an axis X relative to the upright 2 (from dotted line position to solid line position), and the first pulley 312 and the second pulley 322 respectively rotate about the first axle 311 and the second axle 321. The connecting element 4 hence drives the weight-bearing element 61 to move upwards along the axis X (also from dotted line position to solid line position). In the contrary, when the display 2000 and the holder 5 move upwards along the axis X relative to upright 2, the connecting element 4 drives the weight-bearing element 61 to move downwards along the axis X relative to the upright 2. Details would not be repeated again. In this embodiment, through a fixed pulley structure and a movable pulley structure, the one-half of the sum of the weight W1 of the display 2000 and the weight W2 of the holder 5 is equal to the weight W3 of the counter-weight module 6 ((W1+W2)/2=W3) when the external force is removed and all parts are in a stationary state. A connecting section 43 of the connecting element 4 is disposed between the first diverting element 31 and the counter-weight module 6. The tensile force T of the connecting section 43 is one-half of the sum of the weight W1 of the display 2000 and the weight W2 of the holder 5 (T=(W1+W2)/2). Moreover, the first stroke D1 of the holder 5 along the upright 2 is equal to one-half of a second stroke D2 of the counter-weight module 6 along the upright 2 (D1=D2/2). The display 2000 may stop at any position when the external force is removed.

It should be noted that there may be additional elements for different displays on different supporting devices in other embodiments of the present invention (for example, there may be an additional pivoting module between the holder 5 and the display 2000, hence extra weight is added). Therefore, while the display 2000 and the counter-weight module 6 are moving relative to the upright 2, the weights and the frictions between the components disposed between the upright 2 and the display 2000, as well as the weights and the frictions between the components disposed between the upright 2 and the counter-weight module 6 (for example, friction forces exist when each of the first followers 513 is moving in corresponding one of the first sliding grooves 21, as well as when each second followers 613 is moving in corresponding one of the second sliding grooves 22) are all factors contributing to the static balancing state, not merely limited to aforementioned weight W1 of the display 2000, weight W2 of the holder 5 and weight W3 of counter-weight module 6. However, frictions and other forces among the components are omitted in descriptions of embodiments, including the first embodiment aforementioned or the second to fourth embodiments described hereafter, and only the static balancing state achieved between weights among parts aforementioned is described herein. Furthermore, the axis X is parallel to the extending direction of the upright 2 in this embodiment, but the axis X and the extending direction of the upright 2 may form an angle of 45 degrees or any other angle between 0 and 90 degrees in other embodiments. In other embodiments of the present invention, the first followers 513 and the second followers 613 may be replaced with friction elements respectively, so that the friction elements move in the first sliding grooves 21 or the second sliding grooves 22 respectively.

Figure 5:
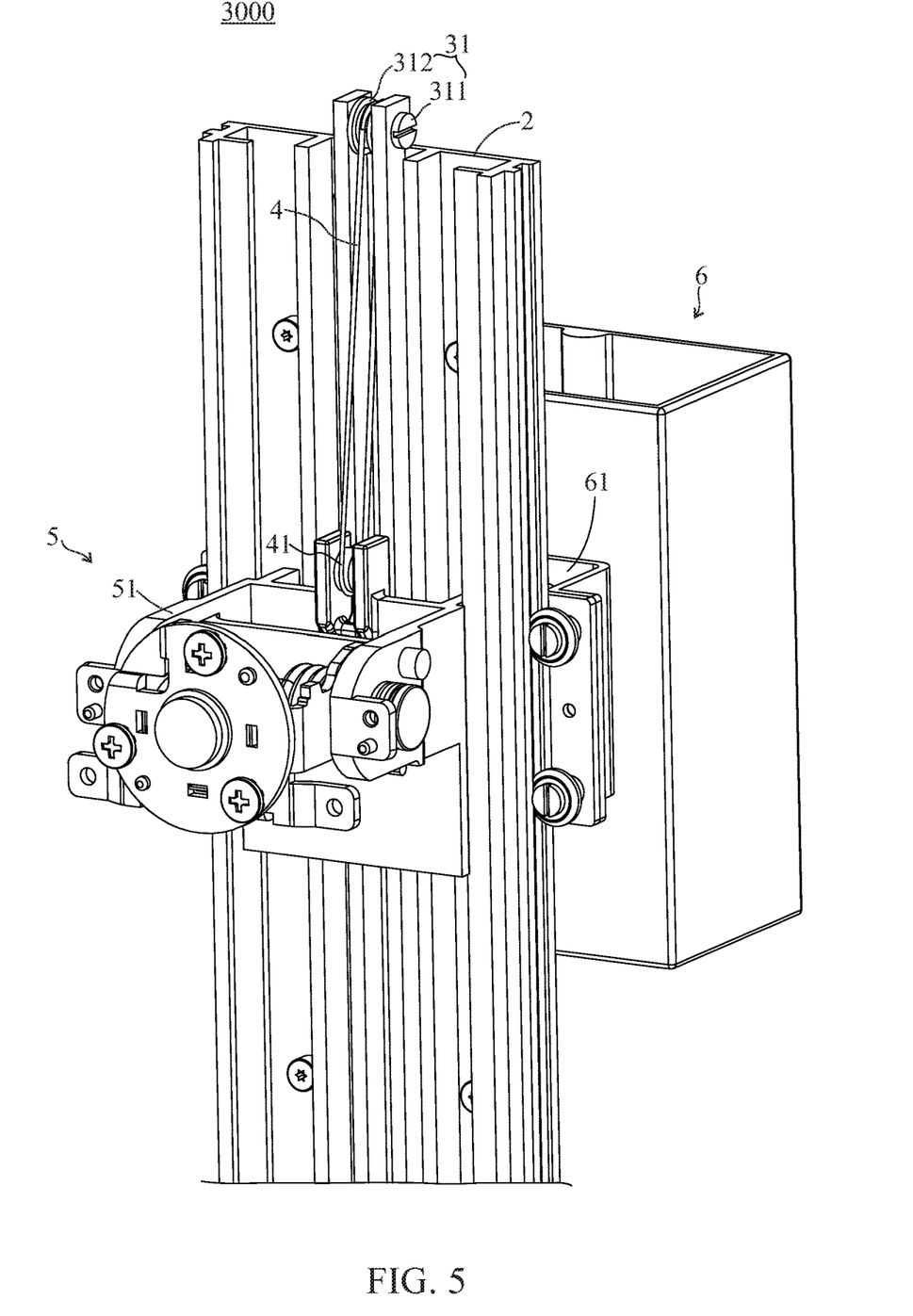
FIG. 5 is a partial perspective view of the second embodiment of the supporting device according to the present invention.
Figure 6:
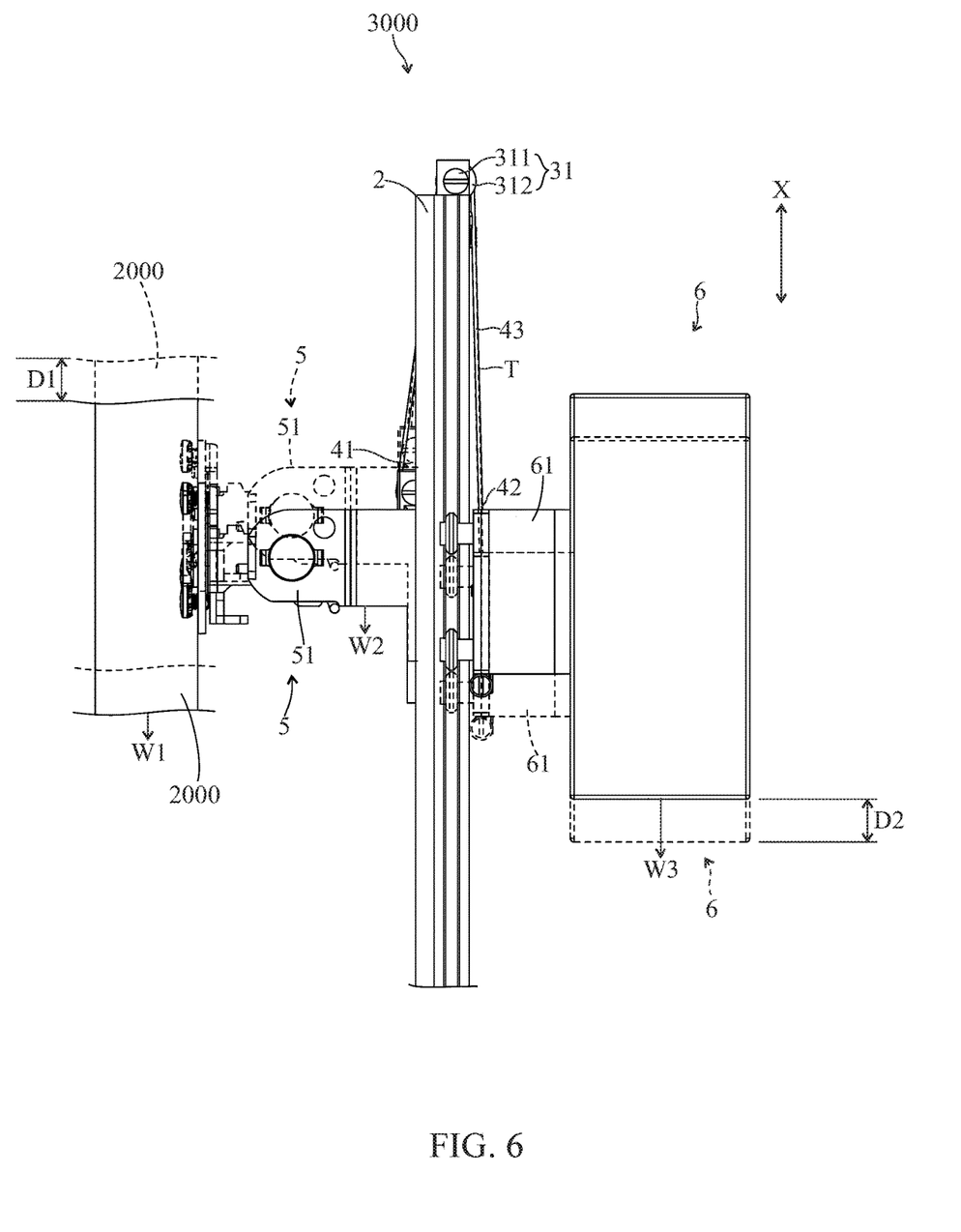
FIG. 6 is an illustration of movement of the second embodiment of the supporting device according to the present invention.

With reference to FIG. 5 and FIG. 6, both are illustrations of the second embodiment of the supporting device 3000 according to the present invention. This embodiment is different from the first embodiment that the diverting structure 3 only has the first diverting element 31. The first axle 311 of the first diverting element 31 is also fixed to the upright 2, and the first pulley 312 is sleeved on the first axle 311, so that the first pulley 312 is able to rotate relative to the first axle 311. The connecting element 4 is partially winding up the first pulley 312, wherein the first end 41 of the connecting element 4 is connected to the sliding element 51 of the holder 5 and the second end 42 of the connecting element 4 is directly connected to the weight-bearing element 61 of the counter-weight module 6. That is to say, the supporting device 3000 of the second embodiment only includes a single fixed pulley structure. Therefore, in this embodiment, when an external force is applied to the display 2000 to move the display 2000 and the holder 5 along the axis X upwards or downwards relative to the upright 2 (as an example, FIG. 6 illustrates the display 2000 and the holder 5 moving downwards along the axis X, and the counter-weight module 6 moving upwards along the axis X, from dotted line position to solid line position) to drive the connecting element 4 to move through the first pulley 312 rotate about the first axle 311, and the weight-bearing element 61 is driven to move along the axis X upwards or downwards relative to the upright 2. Once the external force is removed, all parts remain still, and the sum of the weight W1 of the display 2000 and the weight W2 of the holder 5 is equal to the weight W3 of the counter-weight module 6 (W1+W2=W3). The tensile force T of the connecting section 43 of the connecting element 4 is equal to the sum of the weight W1 of the display 2000 and the weight W2 of the holder 5 (T=W1+W2). The first stroke D1 of the holder 5 along the upright 2 is equal to the second stroke D2 of the counter-weight module 6 along the upright 2 (D1=D2).

Figure 7:
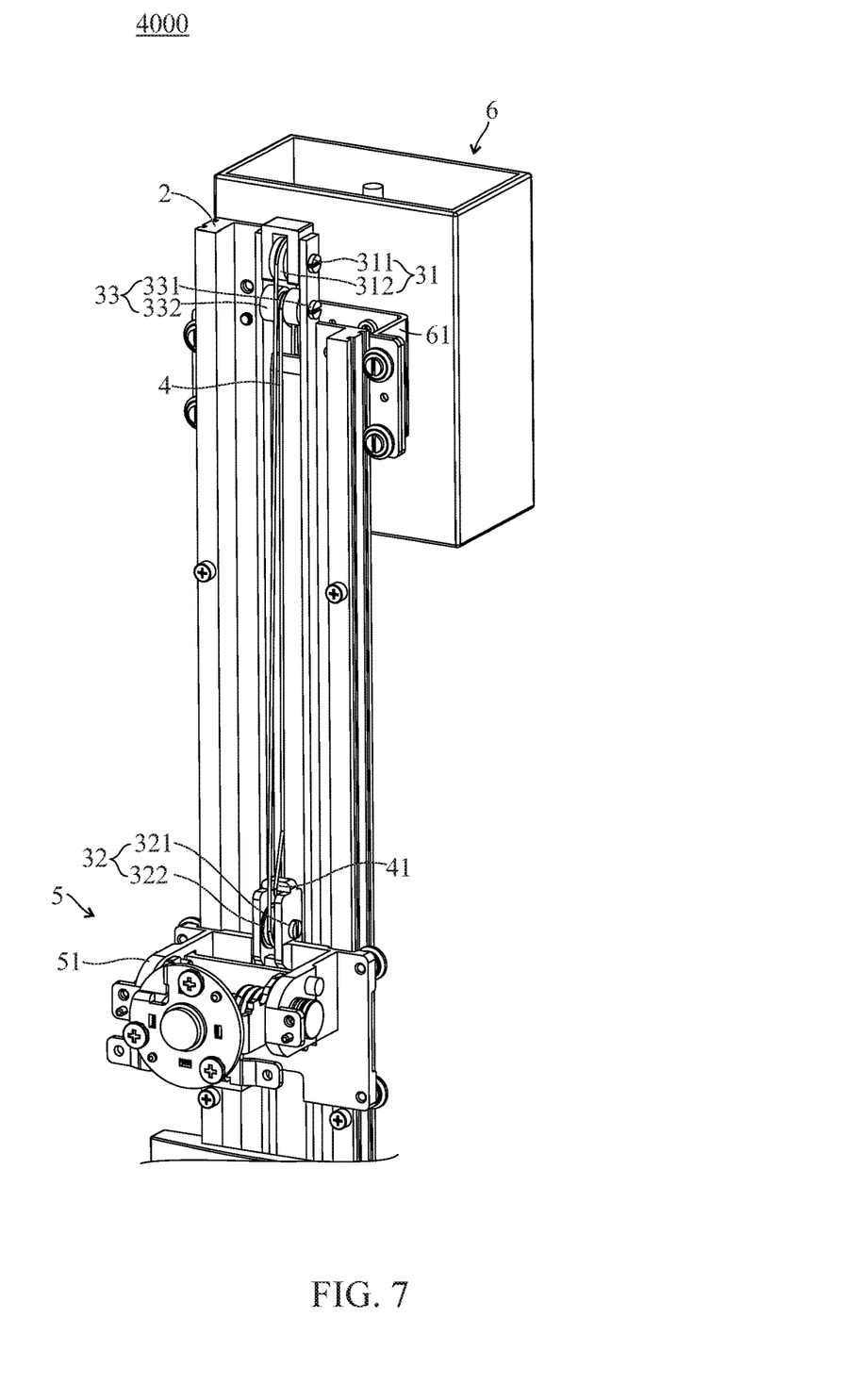
FIG. 7 is a partial perspective view of the third embodiment of the supporting device according to the present invention.
Figure 8:
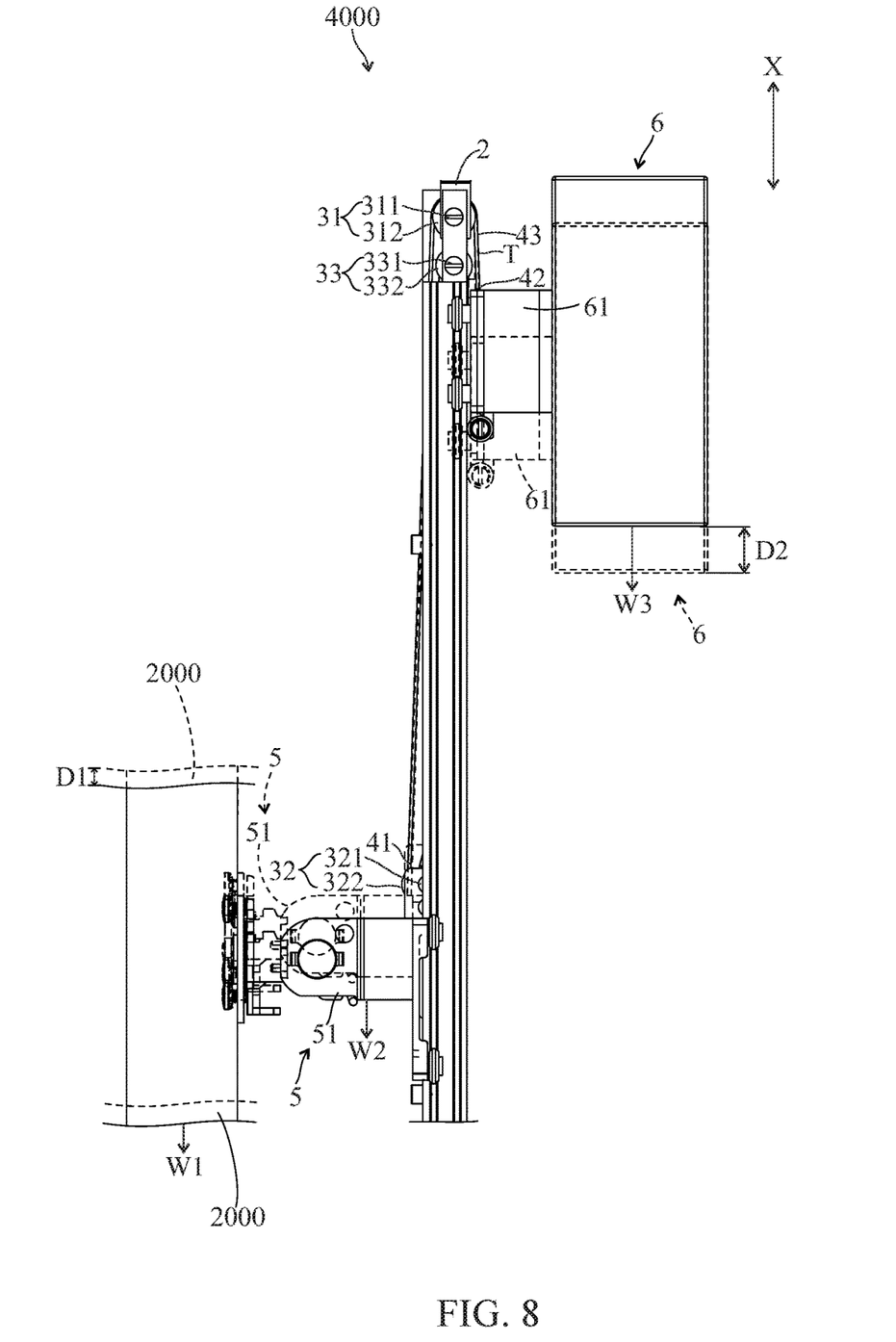
FIG. 8 is an illustration of movement of the third embodiment of the supporting device according to the present invention.

With reference to FIG. 7 and FIG. 8, both are illustrations of the third embodiment of the supporting device 4000 according to the present invention. FIG. 8 illustrates the display 2000 and the holder 5 moving along the axis X downwards as an example (from dotted line position to solid line position). The counter-weight module 6 correspondingly moves upwards along the axis X (from dotted line position to solid line position). This embodiment is different from the first embodiment that the diverting structure 3 of this embodiment further has a third diverting element 33. A third axle 331 of the third diverting element 33 is disposed on the upright 2 and positioned under the first pulley 312, and a third pulley 332 is rotatably sleeved on the third axle 331. The connecting element 4 is sequentially winding up the first pulley 312, the second pulley 322, and the third pulley 332, wherein the first end 41 of the connecting element 4 is connected to the sliding element 51 of the holder 5, and the second end 42 of the connecting element 4 is connected to the weight-bearing element 61 of the counter-weight module 6. Therefore, in this embodiment, the first pulley 312 and the third pulley 332 are fixed pulleys respectively, and the second pulley 322 is a movable pulley. In the third embodiment, the connecting element 4 drives the weight-bearing element 61 to move relative to the upright 2 along the axis X through the first diverting element 31, the second diverting element 32 and the third diverting element 33 when an external force is applied to the display 2000 and the holder 5. Once the external force is removed, all components remain still and the weight W3 of the counter-weight module 6 is equal to the one-third of the sum of the weight W1 of the display 2000 and the weight W2 of the holder 5 ((W1+W2)/3=W3). The tensile force T on the connecting section 43 of the connecting element 4 is one-third of the sum of the weight W1 of the display 2000 and the weight W2 of the holder 5 (T=(W1+W2)/3). The first stroke D1 of the holder 5 along the upright 2 is equal to one-third of the second stroke D2 of the counter-weight module 6 along the upright 2 (D1=⅓D2).

Figure 9:
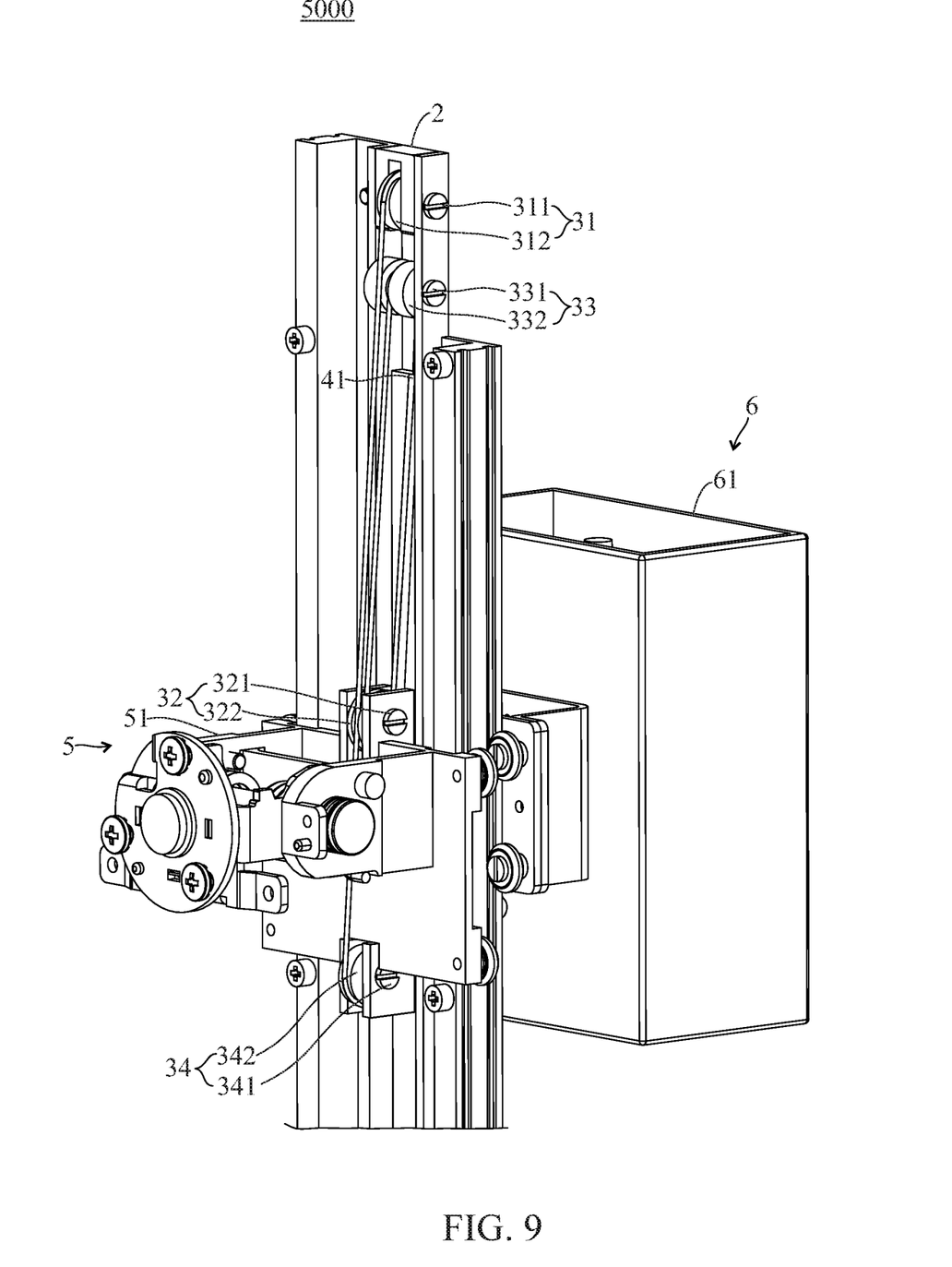
FIG. 9 is a partial perspective view of the fourth embodiment of the supporting device according to the present invention.
Figure 10:
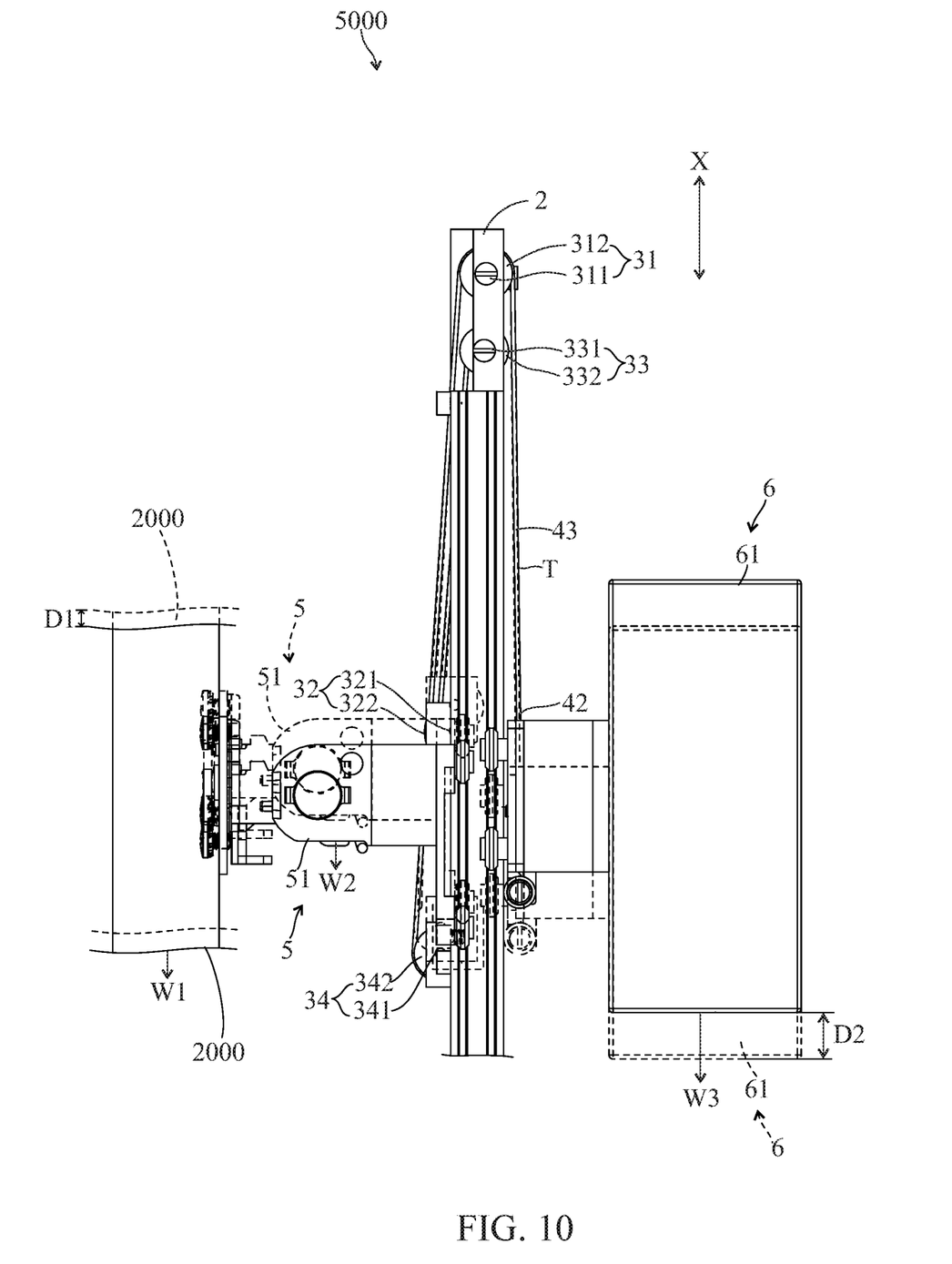
FIG. 10 is an illustration of movement of the fourth embodiment of the present invention according to the present invention.

With reference to FIG. 9 and FIG. 10, both are illustrations of the fourth embodiment of the supporting device 5000 according to the present invention. FIG. 10 illustrates the display 2000 and the holder 5 moving downwards along the axis X as an example (from dotted line position to solid line position), the counter-weight module 6 moves upwards along the axis X (from dotted line position to solid line position). The fourth embodiment is different from the third embodiment that the diverting structure 3 in the fourth embodiment further includes a fourth diverting element 34. The fourth diverting element 34 is disposed on the sliding element 51 of the holder 5, the second axle 321 of the second diverting element 32 is positioned above a fourth axle 341 of the fourth diverting element 34, and a fourth pulley 342 is pivotally sleeved on the fourth axle 341. The connecting element 4 is sequentially winding up the first pulley 312, the second pulley 322, the third pulley 332 and the fourth pulley 342, wherein the first end 41 of the connecting element 4 is fixed to the upright 2, and the second end 42 of the connecting element 4 is connected to the weight-bearing element 61 of the counter-weight module 6. Therefore, in this embodiment, the first pulley 312 and the third pulley 332 are fixed pulleys; the second pulley 322 and the fourth pulley 342 are movable pulleys.

The connecting element 4 is able to drive the weight-bearing element 61 to move relative to the upright 2 along the axis X through the first diverting element 31, the second diverting element 32, the third diverting element 33 and the fourth diverting element 34 when an external force is applied to the display 2000 and the holder 5. Once the external force is removed, all components remain still and the weight W3 of the counter-weight module 6 is equal to one-quarter of the sum of the weight W1 of the display 2000 and the weight W2 of the holder 5 ((W1+W2)/4=W3). The tensile force T on the connecting section 43 of the connecting element 4 is one-quarter of the sum of weight W1 of the display 2000 and the weight W2 of the holder 5 (T=(W1+W2)/4). The first stroke D1 of the holder 5 along the upright 2 is equal to one-quarter of the second stroke D2 of the counter-weight module 6 along the upright 2 (D1=D2/4).

In summary, the diverting structure of the supporting device provided by the present invention may include at least one or more fixed pulley or movable pulley. Hence, even though sliding track modules and constant force springs in the conventional supporting device are omitted, the display may still elevate up and down and stop at any position. It is also less effort to move the display when certain designs are applied.

Although the present invention and its technical characteristics have been explained in relation to its preferred embodiments, it is to be understood that many other possible modifications and variations can be made by persons having ordinary skill in the art without departing from the spirit and scope of the invention as hereinafter claimed.

What is claimed is:

1. A supporting device for supporting a display on a working surface, the supporting device comprising:
    a base, being disposed on the working surface;
    an upright, being disposed on the base;
    a holder, for supporting the display, slidably abutting against the upright;
    a diverting structure, including a first diverting element and a second diverting element, the first diverting element being disposed on the upright and the second diverting element being disposed on the holder in which the first diverting element is a fixed pulley and the second diverting element is a movable pulley;
    a counter-weight module, slidably abutting against the upright; and
    a connecting element, partially winding up the first diverting element and including a first end connecting to one of the upright and the holder, and a second end connecting to the counter-weight module;
    wherein when an external force is applied to move the display relative to the upright, the connecting element is driven to make the counter-weight module move simultaneously, and the display is able to stop relative to the upright at any position when the external force is removed.

2. The supporting device of claim 1, wherein the connecting element is sequentially and partially winding up the first diverting element and the second diverting element, the first end is fixed to the upright, and the second end is connected to the counter-weight module.

3. The supporting device of claim 2, wherein one-half of the sum of the weights of the display and the holder is equal to the weight of the counter-weight module, and a first stroke of the holder along the upright is equal to one-half of a second stroke of the counter-weight module along the upright.

4. The supporting device of claim 3, wherein the connecting element has a connecting section located between the first diverting element and the counter-weight module, and the tensile force of the connecting section is one-half of the sum of the weight of the display and the weight of the holder.

5. The supporting device of claim 1, wherein the diverting structure further includes a third diverting element, wherein the third diverting element is disposed on the upright, and the connecting element is sequentially and partially winding up the first diverting element, the second diverting element, and the third diverting element, the first end is fixed to the holder, and the second end is connected to the counter-weight module.

6. The supporting device of claim 5, wherein one-third of a sum of the weights of the display and the holder is equal to the weight of the counter-weight module, and a first stroke of the holder along the upright is equal to one-third of a second stroke of the counter-weight module along the upright.

7. The supporting device of claim 6, wherein the connecting element has a connecting section located between the first diverting element and the counter-weight module, and the tensile force of the connecting section is one-third of the sum of the weight of the display and the weight of the holder.

8. The supporting device of claim 7, wherein the third diverting element is a fixed pulley.

9. The supporting device of claim 1, wherein the diverting structure includes a third diverting element, and a fourth diverting element, in which the fourth diverting element is disposed on the holder, and the third diverting element is disposed on the upright, wherein the connecting element is sequentially and partially winding up the first diverting element, the second diverting element, the third diverting element, and the fourth diverting element, the first end is fixed to the upright, and the second end is connected to the counter-weight module.

10. The supporting device of claim 9, wherein one-quarter of the sum of the weights of the display and the holder is equal to the weight of the counter-weight module, and a first stroke of the holder along the upright is equal to one-quarter of a second stroke of the counter-weight module along the upright.

11. The supporting device of claim 10, wherein the connecting element has a connecting section located between the first diverting element and the counter-weight module, and the tensile force of the connecting section is one-quarter of the sum of the weight of the display and the weight of the holder.

12. The supporting device of claim 11, wherein the fourth diverting element is a movable pulleys, and the third diverting element is a fixed pulley.

13. The supporting device of claim 1, wherein the upright includes a first sliding groove and a second sliding groove; the holder includes a sliding element; the counter-weight module includes a weight-bearing element and a counter-weight unit; a plurality of first followers of the sliding element and a plurality of second followers of the weight-bearing element are respectively disposed in the first sliding groove and the second sliding groove; the weight-bearing element is connected to the connecting element and disposed between the upright and the counter-weight unit; and when the holder and the counter-weight module move relative to the upright, the first followers slide in the first sliding groove and generate a frictional force, and the second followers slide in the second sliding groove and generate another frictional force.

\* \* \* \* \*